United States Patent

Lonning

[15] 3,668,041
[45] June 6, 1972

[54] METHOD FOR MAKING A FIRE-RETARDANT INSULATION CONSTRUCTION

[72] Inventor: Thor J. G. Lonning, Suffield, Conn.
[73] Assignee: Monsanto Company, St. Louis, Mo.
[22] Filed: Feb. 27, 1970
[21] Appl. No.: 18,393

Related U.S. Application Data

[62] Division of Ser. No. 715,892, Mar. 25, 1968.

[52] U.S. Cl. .............................................. 156/309, 156/333
[51] Int. Cl. ........................................................... C09j 7/00
[58] Field of Search ................... 161/204, 403; 156/306, 309

[56] References Cited

UNITED STATES PATENTS

| | | | |
|---|---|---|---|
| 3,531,369 | 9/1970 | Baumann et al. | 161/204 X |
| 2,589,502 | 3/1952 | Lurie | 161/204 X |
| 3,093,525 | 6/1963 | Wilson et al. | 156/306 X |
| 2,614,953 | 10/1952 | Anglada | 156/306 |

Primary Examiner—Reuben Epstein
Attorney—John W. Klooster, Arthur E. Hoffman and Herbert B. Roberts

[57] ABSTRACT

A method for making a fire-retardant, faced, low density insulation construction from a preformed facing layer comprising vinyl chloride polymer and flame retardant plasticizer composition therefor; a preformed bat comprising a matrix of siliceous fibers bound together with a thermoset aminoplast modified phenolic resin adhesive, and a preformed solid adhesive layer comprising vinyl chloride polymer resin adhesive having a heat softening temperature below the heat softening temperature of said facing layer, said method comprising the steps of heat fusing a said facing layer to a said adhesive layer and heat fusing the laminate comprising such facing layer and such adhesive layer to a said bat.

3 Claims, 6 Drawing Figures

METHOD FOR MAKING A FIRE-RETARDANT INSULATION CONSTRUCTION

This is a division of Pat. application Ser. No. 715,892 filed Mar. 25, 1968.

BACKGROUND

In recent years, much emphasis has been placed on fire retardance in construction materials. However, so far is known, there has been little progress in developing low cost, low density flame retardant insulation constructions of the type employing a low density bat and an organic facing layer.

Such constructions, in spite of the fact that they employ siliceous fibers in the bat are relatively quite combustible, owing to the adhesives and to the facing layer materials used.

There has now been discovered a low density insulation construction which has incorporated thereinto the same siliceous fibers heretofore known to the art in such constructions but instead employs a new combination of facing layer, adhesives and fibers. The resulting construction can be fabricated using conventional techniques. The improved fire retardancy associated with these new constructions is achieved without adversely affecting the desirable thermal insulation properties wanted.

SUMMARY

This invention is directed to improved fire-retardant, faced, low density insulation constructions, to certain laminated facing constructions useful in such insulation constructions, and to methods for making the same, An insulation construction of this invention characteristically has;
A. a bat having a pair of spaced, generally parallel faces comprising a matrix of siliceous fibers ranging in average length from about 0.3 to 8 inches, and in average diameter from about 0.5 to 15 mils bound together with from about 3 to 15 weight percent (based on total bat weight) of a thermoset aminoplast modified phenolic resin adhesive, said bat having an average density of from about 0.3 to 8 pounds per cubic foot and (preferably) an average thickness between said faces of from about 0.5 to 5 inches,
B. a facing layer of plasticized vinyl chloride polymer having an average thickness of from about 3 to 12 mils (preferably 5 to 7 mils), said layer comprising a vinyl chloride polymer (as the major polymeric component) and a plasticizer composition, there being from about 18 to 90 parts by weight of said plasticizer composition for each 100 parts by weight of said vinyl chloride polymer, and
C. (optionally) an adhesive layer comprising vinyl chloride polymer resin adhesive preferably ranging from about 1 to 15 mils in average thickness.

One face of a said facing layer is bonded either indirectly to at least one face of a said bat by means of a said adhesive layer positioned therebetween or to said bat directly.

The plasticizer composition used in the facing layer comprises (there being in a given such composition a sum total of 100 parts by weight):

A. from about 12 to 30 parts by weight of a first halogenated hydrocarbon having:
1. a halogen content ranging from about 40 through 72 weight percent,
2. an average molecular weight of from about 300 through 750 per molecule,
3. a percent weight loss per time unit at 250° C. of from about 1.5 to 14 percent per minute and a percent weight loss at 350° C. of from about 0 to 30 percent per minute, and
4. a weight loss rate at 250° C. of from about 30 to 260 mg./min., and a weight loss rate at 350° C. of from about 0 to 625 mg./min.;

B. from about 12 to 30 parts by weight of a second halogenated hydrocarbon having:
1. a halogen content ranging from about 55 through 75 weight percent,
2. an average molecular weight of from about 600 through 1,100 per molecule,
3. a percent weight loss at 250° C. of from about 0.2 to 1 percent per minute, and a percent weight loss at 350° C. of from about 40 to 60 percent per minute and a percent weight loss at 500° C. of from about 0.5 to 5 percent per minute, and
4. a weight loss rate at 250° C. of from about 5 to 20 mg./min., a weight loss rate at 350° C. of from about 725 to 1200 mg./min., and a weight rate at 500° C. of from about 40 to 80 mg./min.;

C. the difference in said respective weight loss rates between said first halogenated hydrocarbon and said second halogenated hydrocarbon being at least about 100 (preferably about 1,000) mg./min. at 350° C. in any given plasticizer composition of the invention;

D. from about 40 to 75 parts by weight of at least one trisubstituted organo phosphate having:
one trisubstituted organo phosphate having:
1. the structure:

(I)

wherein $R_1$, $R_2$, and $R_3$ are each selected from the group consisting of aliphatic hydrocarbon groups containing from one through 12 carbon atoms each, aromatic hydrocarbon groups containing from six through 12 carbon atoms each halogenated aliphatic hydrocarbon groups containing from two through 18 carbon atoms each and at least one halogen atom for every two carbon atoms, and halogenated aromatic hydrocarbon groups containing from three through 18 carbon atoms each and at least one halogen atom for every six carbon atoms.

Preferably, the trisubstituted organo phosphate is a mixture of both a first trisubstituted organo phosphate and a second trisubstituted organo phosphate. The first trisubstituted organo phosphate has;
1. the structure:

(II)

wherein $R_7$, $R_8$, and $R_9$ are each selected from the group of hydrocarbon radicals consisting of aliphatic groups and aromatic groups,
2. an average of from about eight through 30 carbon atoms per molecule,
3. a percent weight loss at 250° C. of from about 2 to 28 percent per minute, and a percent weight loss at 350° C. of from about 0 to 3 percent per minute, and 4. a weight loss rate at 250° C. of from about 50 to 600 mg./min., and a weight loss rate at 350° C. of from about 0 to 60 mg./min.; and the second trisubstituted organo phosphate has:
 1. the structure:

(III)

wherein $R_4$, $R_5$, and $R_6$ are each selected from the group consisting of aliphatic hydrocarbon groups containing from six through 12 carbon atoms each, aromatic hydrocarbon groups containing from six through 12 carbon atoms each, halogenated aliphatic hydrocarbon groups containing from two through 18 carbon atoms each and at least one halogen atom for every two carbon atoms and halogenated aromatic hydrocarbon groups containing from three through 18 carbon atoms each and at least one halogen atom for every six carbon atoms,
 2. a halogen content of at least about 10 weight,
 3. a percent weight loss at 250° C. of from about 10 to 50 percent per minute, and a percent weight loss at 350° C. of from about 0 to 2 percent per minute, and
 4. a weight loss rate 250° C. of from about 200 to 950 mg./min. and a weight loss rate at 350° C. of from about 0 to 2 mg./min.

Such a preferred plasticizer composition contains on a 100 parts by weight basis in addition to said quantities of said halogenated hydrocarbons from about 35 to 45 parts by weight of said first trisubstituted organo phosphate and from about 8 to 30 parts by weight of said second trisubstituted organo phosphate.

The term "halogen" or "halogenated" as used herein has reference to fluorine, chlorine and bromine. Largely for contemporary economic reasons, chlorine is preferred for use in this invention.

Unless otherwise noted, "weight percent" has reference to total weight percent of a given component, not a total combination.

The term "percent weight loss per time unit" as used herein has reference to weight loss as determined in a so-called duPont Model 950 thermal gravimetric analyzer at an average charge of 20–23 mg. of sample material in air.

The following Table I illustrates some suitable first halogenated hydrocarbons and some suitable second halogenated hydrocarbons for use in the present invention.

The plasticizer compositions used in this invention either can be prepared in the form of mixtures (preferably uniform), or they can be mixed separately with vinyl chloride polymer to produce directly novel heat-fusible, uniform blends of plasticizer composition and vinyl chloride polymer. Typical plasticizer uniform mixtures for use in this invention may be in the form of liquids (including solutions or dispersions) while typical uniform blends are in the form of particulate, free flowing solids. Individual plasticizer components may be solids.

When making a uniformly blended mixture of a plasticizer composition and a vinyl chloride polymer, it is convenient and suitable to blend the respective components together in an appropriate conventional blender until uniformity is reached. Suitable mechanical blenders include chain can mixers, ball mills, ribbon blenders, Henschel blenders, and the like, depending upon circumstances. Optionally, one may first mechanically mix these respective components, and then to heat fuse and particulate before forming a facing layer for use in this invention.

The term "vinyl chloride polymer" as used herein refers to a polymer produced not only by polymerizing vinyl chloride monomer to produce polyvinyl chloride homopolymer, but also by copolymerizing vinyl chloride monomer with other ethylenically unsaturated aliphatic monomers having molecular weights generally under about 260 and copolymerizable with vinyl chloride to produce polyvinyl chloride include olefins, such as ethylene, propylene, and the like; vinylidene monomers, such as vinyl esters of mono-basic organic acids containing: one to 20 carbon atoms (e.g. vinyl ether, 2-ethyl hexyl vinyl ether, benzyl vinyl ether, etc.) and vinylidene chloride; alkyl acrylate esters in which the alkyl group contains one to 20 carbon atoms (e.g. methyl acrylate, butyl acrylate, octadecyl acrylate, etc.); the corresponding alkyl methacrylate esters; dialkyl esters of dibasic organic acids in which the alkyl groups contain two to eight carbon atoms (e.g. dibutyl fumarate, diethyl maleate, etc.); and the like.

Preferred vinyl chloride polymers have chlorine contents ranging from about 45.0 to 56.7 and have molecular weights such that a 0.4 weight percent solution of such polymer in cyclohexanone at 25° C. has a specific viscosity of from about 0.3 to 0.6. More preferred specific viscosities range from about 0.4 to 0.5. A preferred class of vinyl chloride polymer is polyvinyl chloride homopolymer. In general, one should choose a vinyl chloride polymer for use in the present invention which will offer most satisfactory properties in a particular facing layer product.

TABLE I

| Material type [3] | Weight percent halogen content (approx.) Cl | Approx. average molecular weight | Percent weight loss [1] per minute | | | Weight loss rate [2] mg. per minute | | |
|---|---|---|---|---|---|---|---|---|
| | | | 250° C. | 350° C. | 500° C. | 250° C. | 350° C. | 500° C. |
| 1HA | 42 | 530 | 2.13 | 3.2 | ~0 | 47.07 | 70.75 | ~0 |
| 1HB | 52 | 400 | 12.00 | .32 | ~0 | 259.20 | 6.91 | ~0 |
| 1HC | 40 | 520 | | | | | | |
| 1HD | 40 | 320–180 | | | | | | |
| 1HE | 50 | 380–500 | | | | | | |
| 1HF | 42 | 320–480 | | | | | | |
| 1HG | 54 | 325 | 4.17 | 29.14 | ~0 | 89.24 | 623.60 | ~0 |
| 1HH | 68 | 465 | 5.08 | 0 | ~0 | 112.01 | 0 | |
| 1HI | 60 | 550 | 1.50 | 26.00 | ~0 | 34.28 | 594.10 | ~0 |
| 2HA | 70 | 1000 | .77 | 52.00 | 3.00 | 16.48 | 1112.80 | 64.2 |
| 2HB | 60 | 600–800 | | | | | | |
| 2HC | 70 | 900–1100 | | | | | | |

[1] Determined by procedure defined above using TGA apparatus.
[2] Determined by procedure defined above using TGA apparatus.
[3] Material types are listed below. All are petroleum derived chlorinated paraffinic hydrocarbons which are chlorinated following separation from crude oil. The designation 1H is used to indicate first halogenated hydrocarbons, while the designation 2H is used to indicate second halogenated hydrocarbons. Material 1HA is a chlorinated hydrocarbon available commercially as Cereclor S-42 (a trademark of Imperial Chemical Industries, Inc.). Material 1HB is a chlorinated hydrocarbon commercially available as Cereclor S-52 (a trademark of Imperial Chemical Industries, Inc.). Material 1HC is a chlorinated hydrocarbon commercially available as Flexchlor 40 (a trademark of Pearsall Co.). Material 1HD is a chlorinated hydrocarbon commercially available as Chlorowax 40 (a trademark of Diamond Alkali Co.). Material 1HE is a chlorinated hydrocarbon commercially available as Chlorowax 500 (a trademark of Diamond Alkali Co.). Material 1HF is a chlorinated hydrocarbon commercially available as Chlorafin 42S (a trademark of Hercules Powder). Material 1HG is a chlorinated hydrocarbon commercially available as Aroclor 1254 (a trademark of Monsanto Co.). Material 1HH is a chlorinated hydrocarbon commercially available as Aroclor 1268 (a trademark of Monsanto Co.). Material 1HI is a chlorinated polybiphenyl commercially available as Aroclor 5460 (a trademark of Monsanto Co.). Material 2HA is a chlorinated hydrocarbon commercially available as Cereclor S-70 (a trademark of Imperial Chemical Industries, Inc.). Material 2HB is a chlorinated hydrocarbon commercially available as Flexchlor 60 (a trademark of Pearsall Co.). Material 2HC is a chlorinated hydrocarbon commercially available as Chlorowax 70 (a trademark of Diamond Alkali Co.). Preferred first and second halogenated hydrocarbons are chlorinated paraffinic hydrocarbons.

TABLE II

| Material type[3] | Halogen content, Cl | Phosphorous content | Molecular weight | Percent weight loss[1] per minute | | | Weight loss rate[2] ml. per minute | | | Substituent | | | | | |
|---|---|---|---|---|---|---|---|---|---|---|---|---|---|---|---|
| | | | | | | | | | | Formula 1 | | Formula 2 | | | |
| | | | | 250° C. | 350° C. | 500° C. | 250° C. | 350° C. | 500° C. | R$_1$ | R$_2$ | R$_3$ | R$_4$ | R$_5$ | R$_6$ |
| 1PA | | 9.13 | 340.2 | 8.08 | ~0 | ~0 | 70.3 | ~0 | ~0 | Cresyl | Phenyl | Phenyl | | | |
| 1PB | | 8.58 | 362.4 | 18.86 | 1.65 | ~0 | 379.02 | 63.09 | ~0 | Octyl | do | do | | | |
| 1PC | | 7.95 | 390.4 | 8.33 | 2.40 | ~0 | 189.92 | 54.72 | ~0 | Isodecyl | do | do | | | |
| 1PD | | 8.44 | 368.18 | 5.46 | 1.07 | ~0 | 115.75 | 22.68 | ~0 | Cresyl | Cresyl | Cresyl | | | |
| 1PE | | 7.15 | 434.63 | 25.71 | 0 | | 583.62 | 0 | | Octyl | Octyl | Octyl | | | |
| 1PF | | 7.56 | 410 | | | | | | | Xylyl | Xylyl | Xylyl | | | |
| 2PA | 10.88 | 7.92 | 391.8 | 10.40 | ~0 | ~0 | 216.32 | ~0 | ~0 | | | | Chlorophenyl, phenyl, phenyl. | | |
| 2PB | 12.42 | 10.85 | 286 | 41.6 | ~0 | ~0 | 898.56 | ~0 | ~0 | | | | Beta-chloroethyl. | | |
| 2PC | 67.1 | 6.52 | 476.22 | | | | | | | | | | 3 Trichloroethyl. | | |
| 2PD | 43.8 | 8.52 | 364.98 | | | | | | | | | | 2,3-dibromopropyl. | | |

[1] Determined by procedure defined above using TGA apparatus.
[2] Determined by procedure defined above using TGA apparatus.
[3] Material types are listed below. The designation 1P is used to indicate first trisubstituted organo phosphates while the designation 2P is used to indicate second trisubstituted organo phosphates.—1PA=cresyl diphenyl phosphate; 1PB=octyl diphenyl phosphate; 1PC=isodecyl diphenyl phosphate; 1PD=tricresyl phosphate; 1PE=trioctyl phosphate; 1PF=trixylyl phosphate; 1PG=triphenyl phosphate; 2PA=chlorophenyl diphenyl phosphate (available as Santicizer 102 a trademark of the Monsanto Co.); 2PB=tris(beta-chloroethyl) phosphate; 2PC=trichloroethyl phosphate; 2PD=tris(2,3-dibromopropyl) phosphate.

Conventional additives, such as stabilizers, fillers, colorants, processing aids, lubricants, coplasticizers, etc., may be incorporated into the blends used herein for facing layers. Thus, for example, among the processing aids and coplasticizers which may be incorporated into the blends used in this invention are finely divided thermoplastic polymers having molecular weights in excess of about 15,000 such as methyl methacrylate polymers, styrene-acrylonitrile copolymers, styrene-methyl methacrylate copolymers, etc. Such blends preferably contain the conventional stabilizers, lubricants, fillers and epoxy compounds employed in the art for compounding vinyl chloride polymer blends. In general, care must be used when employing such additives that one does not reduce the fire-retardant properties, the low-temperature flexibility properties, and the tensile properties desired in sheets and films made from blends used herein. Usually, the total quantity of such additives in a given blend does not exceed about 15 weight percent thereof.

It is preferred, though not necessary, when prepare a blend of a plasticizer composition used herein with a vinyl chloride polymer to use such polymeric materials in the form of particles at least 90 weight percent of which pass through a 40 mesh USBS sieve. It will be appreciated herein that the term "blend" unless otherwise indicated has reference to a mixture comprising both a plasticizer composition as described above and vinyl chloride polymer as described above. It will be appreciated that the vinyl chloride polymer and the plasticizer composition can be in the physical form of a fluid plastisol.

Sheets and films are made from blends typically by calendering or by casting. If made by calendering, suitable temperatures for a fused blend generally range from about 130° to 215° C., the exact optimum temperature in any given instance depending upon quantity of plasticizer and the molecular weight of the vinyl chloride polymer employed in a given blend. Conventional calendering conditions are equipment well known to those of ordinary skill in the art are employed. On the other hand, if made by casting, a plastisol is first cast at room temperatures and then is heat fused at elevated temperatures using techniques well known to those of ordinary skill in the art.

Known fire retardants can, of course, be added to a blend being used to make a layer to be used in this invention, including antimony oxide, tetrakis (hydroxymethyl) phosphonium chloride or hydroxide, and the like.

By the term "layer" as used herein, generic reference is had to both sheet and film. The term "sheet" refers to heat-fused blends having a thickness in excess of 10 mils, while "film" refers to heat-fused blends having a thickness less than 10 mils. Facing layers used in this invention in general have fire retardancy, low temperature flexibility, and high tensile properties.

Fire retardancy of layers, for purposes of this invention, can be conveniently measured using either one of two procedures. One is designed ASTM Test Procedure No. E84-61; the other is designated Federal Specification No. CCC-T-591B (Methods 5902 and/or 5903). Films are typically evaluated using the latter procedure which tests flame retardancy in a vertically suspended sample. The first procedure is a tunnel test which evaluates flame propagation in a non-vertically suspended sample.

As used herein, the term "low temperature flexibility" can be considered to have reference to the flexibility of a sheet or film derived from a heat-fused vinyl chloride polymer blend used in this invention measured under certain controlled conditions for example by the so-called Masland Cold Crack procedure as described in ASTM Test Procedure No. D-1790-62.

Similarly, as used herein, the term "high tensile properties" can be considered to have reference to the mechanical properties of a sheet or film derived from a heat-fused vinyl chloride polymer blend of this invention measured under certain controlled conditions. For example, to have "high tensile properties" at least two of three measurements on a given film or sheet sample can be made, as follows:

1. percent elongation using ASTM Test Procedure No. D-888-61,
2. 100percent modulus using ASTM Test Procedure No. D-888-61.
3. Ultimate tensile strength using ASTM Test Procedure No. D-888-61.

The insulation bats used in the present invention utilize, as indicated a matrix of siliceous fibers whose physical characteristics are as described above. Such fibers are well known in the art; they can be made by a variety of techniques from a plurality of different starting materials.

To bind the fibers together in a bat, the present invention employs as the adhesive an aminoplast modified phenolic resin. The term "aminoplast" as used herein has reference to one or more compounds selected from the group consisting of dicyandiamide, melamine, and urea, and the like. Dicyandiamide is preferred.

Aminoplast modified phenol-aldehyde resins suitable for use in this invention may be made by techniques taught by Mesdagh et al. in U.S. Patent No. 3,004,941. Aminoplast modified resins of phenol and formaldehyde are preferred.

Thus, such a modified phenol-formaldehyde resin usable in this invention can be prepared by first condensing from about 1.5 to 5 mols of formaldehyde per mol of phenol. Preferentially, the condensation is accomplished using an alkaline catalyst. The condensation is continued until a predetermined free formaldehyde content is reached, as determined, for example, by the hydroxylamine hydrochloride test. A suitable free-formaldehyde content is about 9 to 15 weight percent based on total weight of starting reactants. The formaldehyde used in the starting reactants can be in the ratio range of about 1.5 to 5 mols per mol phenol, and, preferably, ranges from about 1.5 to 3.5 mols of formaldehyde per mol of phenol. Such aqueous condensation product of phenol and formaldehyde, having the excess formaldehyde, is cooled to about 30° to 50° C. The aminoplast dicyandiamide, melamine, or urea, or mixture thereof) is then added in such a proportion that the ratio is generally, and, preferably, about 1 mol of the aminoplast to about 0.5 to 2.0 mols of formaldehyde in the resulting formaldehyde condensation product with dicyandiamide, melamine, and/or urea and, more preferably, about 1.2 to 1.6 mols of formaldehyde. For example, when employing a mixture of dicyandiamide, melamine, and urea, the mixture can consist of from about 10 to 90 weight percent of dicyandiamide and, correspondingly, about 90 to 10 weight percent of urea.

Alternatively, the process for preparing an aminoplast modified phenol-formaldehyde resin for use in this invention can be accomplished by reacting dicyandiamide, melamine, or urea, or mixture thereof, with formaldehyde in the presence of an alkaline catalyzed reaction product of phenol-formaldehyde having no excess free formaldehyde. This process can be initiated by first reacting phenol with formaldehyde under alkaline catalyzed conditions to provide a water-dilutable condensate of phenol-formaldehyde having no free formaldehyde. The ratio of formaldehyde to phenol, and of aminoplast to formaldehyde remains as above indicated.

Other methods known to the art can be used for preparing such a modified resin for use in this invention. Typically, such methods involve the separate preparation of a phenol-aldehyde condensate resin composition which is initially not only water soluble but also water dilutable to the extent desired. The dicyandiamide, melamine and/or urea formaldehyde condensation product, as those skilled in the art readily appreciate, can be prepared separately by conventional techniques in the form of a resin which is typically not only water soluble, but also water dilutable to the extent desired. Such a separately prepared formaldehyde condensation product with dicyandiamide, melamine or urea can have a mol ratio of dicyandiamide melamine and/or urea to aldehyde of from about 0.5 to 5. The resin is then added to the preformed phenol-aldehyde resin. Preferably, aminoplast modified phenol-aldehyde resins for use in this invention have a total nitrogen content ranging from about 3 to 12 weight percent (dry weight basis), and, in general, this nitrogen content is less than about 18 weight percent.

It is to be noted that, in a resin composition for use of this invention, the chemical composition of such an aminoplast phenol-aldehyde resin can itself vary. For example, although during the reaction of the condensates, the phenol, the dicyandiamide, the melamine, and/or the urea will preferentially react with the aldehyde, it is expected that certain other reaction products will also form during the condensation reaction. These products would be, for example, a phenol-dicyandiamide-formaldehyde reaction product. When employing a mixture of dicyandiamide and urea, a phenol-dicyandiamide-urea-formaldehyde reaction product can form as well as a mixture of phenol-dicyandiamide-formaldehyde, phenol-dicyandiamide-urea-formaldehyde and phenol-urea-formaldehyde reaction products. It is understood that these reaction products would only exist in minor amounts with the predominant portion of the condensation reaction products being phenol-formaldehyde and dicyandiamide-formaldehyde, or mixtures of dicyandiamide-formaldehyde and urea-formaldehyde. In general, the preparation of aminoplast modified phenol-aldehyde is known to those skilled in the art and does not form a part of the present invention. As those skilled in the art will appreciate, the aminoplast modified phenol-aldehyde resins used in the present invention are of the resole type since not only is the phenol-aldehyde condensation conducted under basic catalysis conditions, but also the aminoplast modification thereof is conducted under basic catalysis conditions.

The processes for making bats using such fibers and such resin adhesive are conventional and well known to the prior art, and involve applying (as by spraying) to the fibers appropriate quantities of such a given resin adhesive and thereafter forming the resulting fibers together into a desired non-woven configuration of the desired dimensions and density. Sometimes a bat contains additional components besides the resin adhesive and fibers, as those skilled in the art of bat manufacture fully appreciate, such as diluents, fungicides, colorants, moisture repellants, etc. Known fire retardants can, of course, be added to the fibrous components used to make a bat, if desired. Density of a bat is not critical for purposes of this invention, but a cross-sectionally rectangular configuration for a bat is preferred. After forming into a bat, the construction is maintained in a desired configuration and exposed to sufficient heat to crosslink or thermoset the resin adhesive and thereby form a bat suitable for use in this invention. Suitable curing temperatures range from about 250° to 400° F. and suitable curing times range from about 5 minutes to 1 hour. In general, the higher the curing temperature, the shorter the curing time.

The vinyl chloride polymer resin adhesive system optionally used to attach a facing layer to a bat can, in general, be a chemical composition of this type as taught by the prior art. Thus, such an adhesive can be initially in the the form of a solid or liquid (e.g. a solution, dispersion, or emulsion). Such a liquid adhesive may be applied to one face of a facing layer or a bat by conventional means, including spraying, dipping, knife coating, or the like. After such coating, the bat is either applied directly to the facing layer with the coated adhesive layer between the bat and the facing layer, or the facing layer so coated with adhesive is allowed to dry as in air. The latter procedure is conveniently used, for example, when the adhesive used is heat activatable when in dry form. When a heat activatable adhesive system is used, a facing layer coated with a dried heat activatable adhesive layer is conveniently storable before use, i.e. before being bonded to a bat.

When the vinyl chloride polymer resin adhesive is initially in the form of a solid, it is preferred that the adhesive be in the physical form of a preformed layer. Such layer may be affixed to one face of a facing layer by means of conventional heat lamination procedures in a first step before the resulting laminate of facing layer and adhesive layer is laminated using said adhesive layer to a bat. Alternatively, such lamination of adhesive layer to facing layer and to bat can be accomplished substantially simultaneously.

Usually, though not necessarily, an adhesive layer used in this invention is heat softenable at a temperature below the heat softening point or temperature of the facing layer. More preferable, when the adhesive layer is a preformed film or sheet, it heat softens at a temperature which is at least 50° C. below the heat softening temperature of the facing layer. A preformed adhesive layer is preferably in the form of a layer ranging from about 3 to 12 mils in average thickness.

Preferred vinyl chloride polymers for use in the resin adhesives employed in the present invention are those wherein, in a given such polymer, at least 50 weight percent thereof is derived from a vinyl chloride monomer with the balance up to 100 weight percent of such given copolymer being an ethylenically unsaturated monomer copolymerizable with the vinyl chloride monomer, as described above. More preferred such copolymers for such a resin adhesive are those formed using: Olefins such as propylene or an ethylene; vinyl acrylate; and vinyl acetate (the latter being most preferred). Thus a most preferred copolymer is one containing from about 88 to 86 weight percent vinyl chloride and from about 12 to 14 weight percent vinyl acetate. In general, it is preferred to use vinyl chloride copolymers having inherent viscosities (0.2percent in cyclohexanone at 25° C.) of from about 0.48 to 0.52. Such copolymers can be used either in liquid form or in solid form, as generally indicated above.

In general, a vinyl chloride polymer resin adhesive used in the present invention should have a flame spread rate of less than about 50 as measured using the so-called small flame tunnel test as described by H.L. Vandersall in Journal of Paint Technology, Vol. 39, No. 511 for August, 1967. For purposes of this test, it will be appreciated by those skilled in the art that a given vinyl chloride polymer resin adhesive is first formed into a layer approximately 2 mils thick (dry thickness basis). Thereafter, the dried film is subjected to the aforeindicated test procedure to determine its fire retardancy.

It will be appreciated that a vinyl chloride polymer resin adhesive used in this invention may contain as an integral part thereof fire-retardant materials known to the prior art, including both inorganic materials, such as antimony oxide, and organic materials, such as brominated or halogenated compositions, such as tris 2, 3-dibromopropyl phosphate and the like.

As those skilled in the art will appreciate, it is preferred but not necessary to use for purposes of this invention a vinyl chloride polymer resin adhesive having a relatively high tensile strength, since the bond between facing layer and bat can be largely mechanical. In general, the bonding force exerted by an adhesive layer positioned between a facing layer and a bat should be such that, in a given insulation construction of the invention, the peel force required to separate such facing layer from such bat at the point where bat is bound to facing layer through the adhesive layer is in excess of the structural integrity of a bat. Thus, the bat should pull apart or otherwise disintegrate before partition occurs between facing layer and bat at or in an adhesive layer in a manual peel test. As those skilled in the art will appreciate, owing to the enormous variations in structural integrity in an insulation construction of this invention which are possible without departing from the spirit and scope of the invention, it is not possible or practical to put any numerical values upon exact peel strength values or structural integrity values generally associated with this invention. Obviously, in a given situation, the various parameters are so adjusted so as to produce bonds between facing layer, adhesive layer and bat which are consistent with the use to which a given insulation construction is to be placed.

When using a liquid vinyl chloride polymer resin adhesive to make an adhesive layer, a preferred procedure involves coating the liquid adhesive upon one face of a facing layer as opposed to coating the liquid adhesive upon one face of the bat, before bringing bat and facing layer together. A suitable liquid adhesive system preferably as a total solids content (dry weight basis) of from about 10 to 80 weight percent. The carrier liquid involved for safety and ease of application is preferably aqueous.

In general, in bonding a facing layer to a bat, one may optionally use a vinyl chloride polymer resin adhesive or one may directly heat fuse a facing layer to a bat. Initially, if an adhesive is employed, such is initially either in a liquid form (including solutions, emulsions, and dispersions) or in a solid form (especially preformed layers) as described above. Such a resin adhesive in a liquid form is typically applied in a continuous manner to one face of a facing layer just before such layer and a bat are brought together during a process for making an insulation construction of this invention. On the other hand, when such a resin adhesive is in a solid form, it may be inserted between a facing layer and a bat as such are brought together continuously during a process for making an insulation construction for this invention (in which event the resin adhesives may be in the form of preformed film or sheet), or it may be first bonded by heat fusion to a facing layer, and then such two layered composite laminate is brought together with the bat under appropriate conditions of heat and pressure. In the latter situation, the resin adhesive may initially be in the form of solid particles, or be in the form of a continuous wet-applied adhesive layer on the facing layer. Manufacturing techniques for making insulation constructions of this invention are illustrated by reference the attached drawings and figure description below. It is preferred to bond a facing layer to a bat in the presence of heat and pressure.

FIGURE DESCRIPTION

Figures 1, 2, 3:
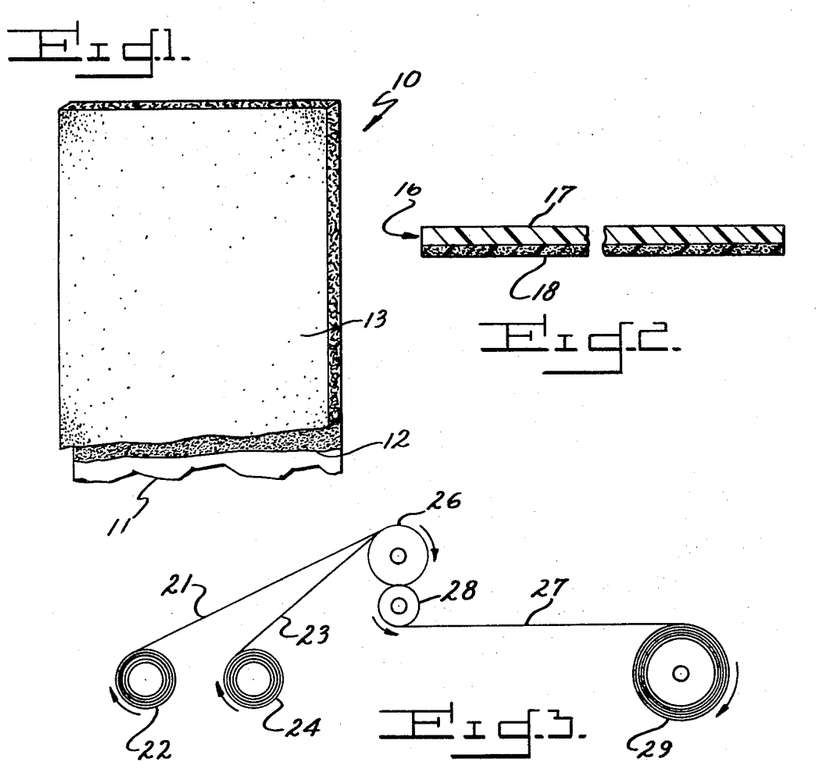
Fig. 1 is a diagrammatic representation of one embodiment of an insulation construction of the invention shown in vertical section.
FIG. 2 is a diagrammatic representation of one embodiment of a laminated facing construction adapted for use as a facing layer in a insulation construction of the invention.
FIG. 3 is a diagrammatic representation of one process for making a construction of FIG. 2.

Turning to the drawings, there is seen of FIG. 1 an insulation construction of the invention herein designated in its entirety by the numeral 10. Construction 10 is seen to comprise a facing layer 11, and a bat 13, with layer 11 being bonded to bat 13 by means of an adhesive layer 12, the composition of each being as elsewhere described herein.

In FIG. 2 is seen a preformed or separately formed laminated facing construction designated in its entirety by the numeral 16 which is suitable for use in the manufacture of a construction 10. Construction 16 is seen to comprise a facing layer 17 which is directly bonded to an adhesive layer 18, the composition of each being as elsewhere described herein.

Typically, a facing layer 11 or 17 ranges in average thickness from about 3 to 12 mils, while an adhesive layer 12 or 18 ranges in average thickness from about 1.5 to 6 mils, but these layers can be thinner or thicker without departing from the spirit and scope of this invention. Also typically, a bat 13 ranges in average thickness from about 0.5 to 5 inches but can be thinner or thicker without departing from the spirit and scope of the invention.

FIG. 3 illustrates one apparatus and method used to make a construction of FIG. 2. Here, a facing layer 21 of facing is continuously unwound from a payoff roll 22, and a preformed adhesive layer 23 is continuously unwound from a payoff roll 24. Layer 21 and layer 23 are brought into face-to-face contact with one another as they pass together over a heated laminating roll 26. The velocity of payoff, respectively, of rolls 22 and 24, and of roll 26, as well as the temperature of roll 26 and the contact time of layers 21 and 23 with roll 26 are all regulated so as to produce the desired continuous lamination of layer 21 to layer 23. To remove the resulting composite laminate structure 27 from roll 26 controllably, the composite laminate structure 27 is passed over a stripper roll 28 before being wound up on take-up roll 29 to complete the operation. Uusually ambient air is used to cool the composite laminate structure 27 before same is placed on take-up roll 29 and thereby prevent undesired interlaminating on take-up roll 29 of laminate structure 27. However, to pass the composite laminate structure 27 over one or several cooling rolls is sometimes desirable (not shown) prior to winding it up on roll 29. The time temperature conditions of laminating thusly are described elsewhere herein. Roll 29 is typically stored before use.

Figure 4:
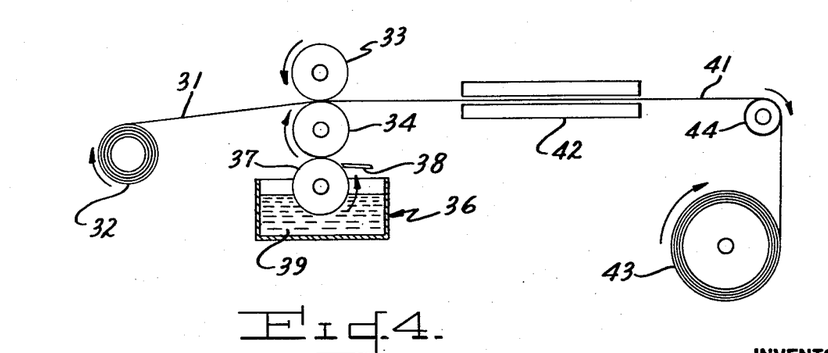
FIG. 4 is a diagrammatic representation of a second process for making a construction of FIG. 2.

FIG. 4 illustrates another apparatus and method for making a construction of FIG. 2. Here a facing layer 31 is continuously unwound from a payoff roll 32 and passed between a pressure or idler roll 33 and a combined drive and transfer roll 34 in an adhesive applicator assembly (conventional) 36. As transfer roll 34 revolves, it is continuously coated with liquid adhesive from applicator roll 37. Applicator roll 37 is wet with such liquid adhesive from reservoir 39, quantities of adhesive on roll 37 being distributed and controlled by the spacing between roll 37 and a doctor blade 38.

The resulting so-coated composite structure 41 is passed thereafter through drier 42 to remove carrier fluid from liquid adhesive and leave the composite laminate structure 41 coated with a layer of thermoplastic adhesive. Compositions of such adhesive, and coating conditions are described elsewhere herein. The resulting dried laminate structure 41 is wound up on take-up roll 43. Roll 44 serves as a guide. Roll 43 is typically stored before use.

Figure 5:
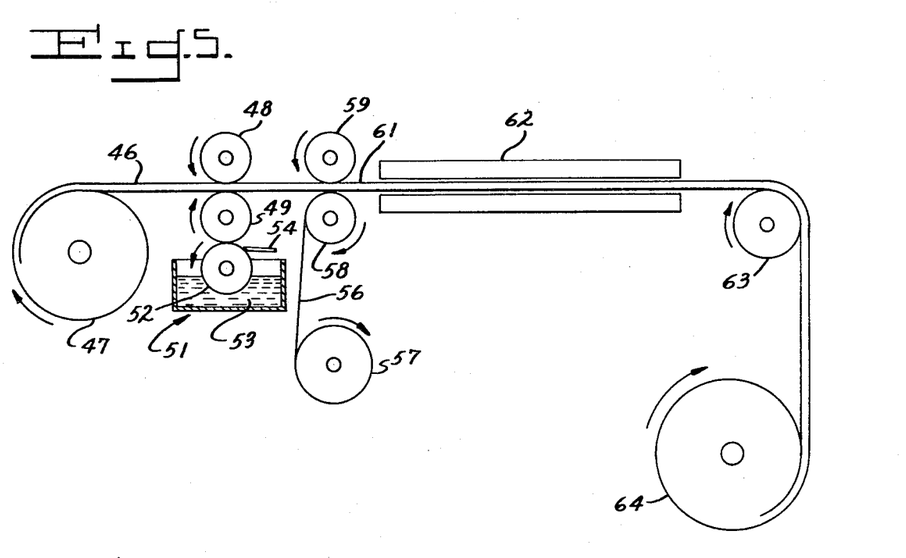
FIG. 5 is a diagrammatic representation of one process for making a construction of FIG. 1.

FIG. 5 illustrates one apparatus and method used to make a construction of FIG. 1. Here a bat 46 is continuously unwound from a payoff roll 47 and passed between a drive roll 48 and a transfer roll 49 in an adhesive applicator assembly (conventional) 51. As transfer roll 49 revolves, it is continuously coated with liquid aminoplast modified phenolic resin adhesive from applicator roll 52. Applicator roll 52 is wet with such liquid adhesive from reservoir 53, quantities of adhesive on roll 52 being distributed and controlled by the spacing between roll 52 and a doctor blade 54.

Concurrently, a facing layer 56 is continuously unwound from a payoff roll 57. Bat 46, duly coated with adhesive, and facing layer 56 are brought into face-to-face contact with one another between laminating rolls 58 and 59.

The resulting composite structure 61 is conveniently passed thereafter through drier 62 to remove carrier fluid (if present) from liquid adhesive, and leave the desired insulation construction 61 which is conveniently passed over a guide roll 63 onto a take-up roll 64 for storage. The product laminate 61 can be cut up into lengths of desired dimension for convenience before use and/or sale.

Figure 6:
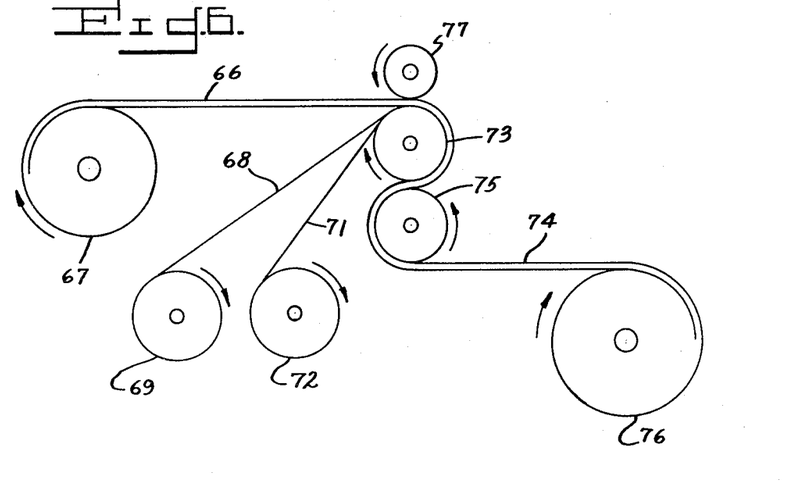
FIG. 6 is a diagrammatic representation of a second process for making a construction of FIG. 1.

FIG. 6 illustrates another apparatus and method for making a construction of FIG. 1. Here a bat 66 is continuously unwound from a payoff roll 67, a preformed adhesive layer 68 is continuously unwound from a payoff roll 69, and a facing layer 71 is continuously unwound from a payoff roll 72. Bat 66 is brought into contact with one face of layer 68 while facing layer 71 is brought into contact with the opposed face of layer 68 all over the surface of a heated laminating roll 73. Facing layer 71 is adjacent the surface of roll 73. Preferably facing layer 71 and adhesive layer 68 are contacted with one another just before bat 66 and adhesive layer 68 are contacted with one another, thereby to give time for heat transfer and softening of adhesive layer 68 before contact with bat 66. The velocity of payoff from respectively, rolls 67, 69 and 72, as well as temperature of roll 73 and the contact time of bat 66, layer 68, and layer 71 with roll 73 are, all regulated so as to produce the desired continuous lamination of layers 68 and 71 with bat 66 and thereby form a desired laminate construction 74.

To remove the resulting composite laminate structure 74 from roll 73 controllably, the composite laminate structure 74 is passed over a stripper roll 75 before being wound up on take-up roll 76 to complete the operation. Usually ambient air is used to cool the composite laminate structure 74 before same is placed on take-up roll 76. However, it is sometimes desirable to pass the composite laminate structure 74 over one or several cooling rolls (not shown) prior to winding it up on roll 76.

The product laminates can be cut up into lengths if desired before use and/or sale.

The time-temperature conditions of laminating in accordance with the apparatus and method of FIG. 5 and that of FIG. 6 are generally those heretofore used in the art to bond cellulosic facing layers to insulation bats, unless otherwise indicated specifically. Observe that the equipment used is of the general type heretofore used in the art of continuous lamination.

EMBODIMENTS

The following additional examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLE A — PREPARATION OF A BAT

Resin Manufacture

To a reaction vessel fitted with an agitator, a heater and a condenser adapted for refluxing under vacuum conditions, add 100 parts of phenol, 340 parts of 37 percent formalin and 3.7 parts of sodium hydroxide to provide a pH of 8.5–9.0. The mixture is allowed to react by providing a temperature of about 70° C. Reaction is continued until the free formaldehyde in the reaction mixture drops to a predetermined content of approximately 12.2 percent by weight of the reaction mixture as determined by the hydroxylamine hydrochloride test. The product is then cooled to 40° to 50° C. and the pH adjusted to 7.5–8.0 by the addition of 10 percent hydrochloric acid. The reaction mixture at this point is considered to be infinitely water dilutable, i.e. 24 or more volumes of water may be mixed with 1 volume of the reaction mixture at a temperature of 24° to 26° C. without causing the mixture to exhibit haziness or milkiness. 65 parts of dicyandiamide are then added and the mixture is heated to 50° to 70° C. When the dicyandiamide becomes dissolved or about the time the reaction mixture reaches 60° to 70° C., the reaction is arrested by cooling to 20° to 30° C.

Binder Preparation from Resin

A portion of the resin prepared as just described is added to another reaction vessel fitted with an agitator and diluted with water to about 8 percent resin solids. To this mixture is added about 20 weight percent ammonium hydroxide (based on resin solids) and about 1 weight percent ammonium sulfate (based on resin solids).

Glass Fiber Preparation

Glass marbles are melted in an appropriate furnace at about 1,500° F. and the melt is extruded into fibers so as to form a matrix composed of fibers 90 weight percent of which range from about 1 to 6 inches in length and from about 1 to 10 mils in average diameter.

Bat Preparation

The above described binder is uniformly sprayed at the rate of about 15 weight percent resin syrup (based on total mixture weight) onto the above described fibers, and the so-sprayed fibers are sucked onto a porous continuously moving conveyor screen. During this operation, the resin to water balance is regulated so that substantially no pre-cure of resin occurs. The resulting bat comprises fibers and a syrupy phenolic resin. This bat is then formed by continuously passing same while on the conveyor screen through an oven in which the interior atmosphere is maintained at a temperature ranging from about 400° to 500° F. Residence time of the bat in the oven is about 5 minutes. The product bat is about 1 inch thick and has a density of about 1 lb./per cubic foot. It is cut up into lengths and stored. Alternatively, the backing member is continuously applied thereto (as described below) and the resulting construction is coiled convolutely into rolls.

EXAMPLE B — BAT PREPARATION

This preparation procedure of Example A is repeated, except that process parameters are adjusted to produce a bat 2 inches thick, with density as above described.

EXAMPLE C — BAT PREPARATION

This preparation procedure of Example A is repeated again except that in place of the glass fibers there is used siliceous fibers derived from naturally occurring siliceous rock so as to produce a fibrous material known to the art as "rock wool". Product bats produced from this fibrous material are formed so as to be approximately 4 inches thick, respectively, with densities as above described.

EXAMPLE D — PREPARATION OF ADHESIVE

To prepare a solid (at room conditions), preformed adhesive film especially adapted to be laminated to a facing layer prior to the time when such facing layer is being laminated to a bat, the following procedure is used: A blend is prepared by first dry blending the following indicated components together and thereafter heat fusing and calendering same into a film of about 3 mils in thickness using temperatures ranging from about 240° to 300° F.:

| COMPONENT | Parts by weight |
|---|---|
| Vinyl chloride/vinyl acetate copolymer[1] | 97 |
| Acrylic polymer[2] | 3 |
| Chlorophenyl diphenyl phosphate[3] | 20 |
| Chlorinated paraffin[4] | 12 |
| Barium/cadmium fatty acid salt[5] | 1.5 |
| Stearic acid | 0.5 |
| Antimony oxide[6] | 5 |

Footnotes
[1]This vinyl chloride/vinyl acetate copolymer contains about 13 weight percent vinyl acetate and about 87 weight percent vinyl chloride and is obtained from Union Carbide and Plastics Co. under the trade designation VYHH.
[2]This acrylic polymer modifier is that available commercially as Acryloid K-120-N, a trademark of the Rohm & Haas Co.
[3]This chlorophenyl diphenyl phosphate is that available commercially as Santicizer 192, a trademark of the Monsanto Company (material 2PA in Table II above).
[4]This chlorinated paraffin is material 1HB in Table I above.
[5]This barium/cadmium fatty acid salt is that stabilizer material available commercially as mark 1004, a trademark of the Argus Chemical Co.
[6]This antimony oxide is in the form of particles substantially 100 weight percent of which are smaller than about 10 microns.

In place of preparing this adhesive film by the above-indicated calendering procedure, it can be formed by using a so-called Zimmer machine.

EXAMPLE E — PREPARATION OF ADHESIVE

To prepare a liquid adhesive, 100 parts by weight of a vinyl chloride polymer composed of about 13 weight percent vinyl acetate, about 1 weight percent maleic acid, and the balance up to 100 weight percent of such polymer being vinyl chloride (polymer used is that available commercially under the trade designation VMCH from Union Carbide Plastics Co.) is dissolved in 400 parts by weight of methyl ethyl ketone. In this solution are then dissolved the following components:

| COMPONENT | Parts by weight |
|---|---|
| Barium/cadmium carboxylic acid salt stabilizer[1] | 1 |
| Epoxidized soya bean oil[2] | 3 |
| Trioctyl phosphate[3] | 6 |
| Chlorinated paraffin[4] | 4 |

Footnotes
[1]This barium/cadmium carboxylic acid salt stabilizer is that available commercially as "Mark LL", a trademark of Argus Chemical Co.
[2]This epoxidized soya bean oil is that available commercially as "Paraplex C-62", a trademark of the Rohm & Haas Co.
[3]This phosphate is material 1PE of Table II above.
[4]This chlorinated paraffin is material 1HB of Table I above.

EXAMPLE F — PREPARATION OF ADHESIVE

To prepare a liquid adhesive, there are added to 84 parts by weight of trioctyl phosphate (the material 1PE of Table II above) 1 part of a barium/cadmium phenate stabilizer (available commercially as "Mark LL", a trademark of Argus Chemical Co.) while the materials are being mixed together in a high speed mixer until homogeneity is reached. Thereafter, to the resulting mixture are added 15 parts by weight of the vinyl chloride polymer described in Example E above while mixing in such high speed mixer until homogeneity is achieved.

TABLE III

| Example Number | Foot-note | H | I | J | K | L | M | N | O | P | Q | R | S | T | U | V |
|---|---|---|---|---|---|---|---|---|---|---|---|---|---|---|---|---|
| Polymer: | | | | | | | | | | | | | | | | |
| PVC | 1 | 92 | 100 | | 100 | 100 | 100 | | 100 | 100 | 100 | 100 | 100 | 100 | 100 | 100 |
| VC/CPE | 2 | | | 100 | | | | 100 | | | | | | | | |
| Plasticizer: | 3 | | | | | | | | | | | | | | | | |
| 1HB | | | 10 | 10 | 11.5 | 12.5 | 14 | 12 | 10 | | 10 | 10 | 12.5 | 11.5 | 10 | |
| 1HE | | | | | | | | | | 10 | | | | | | |
| 1HH | | | | | | | | | | | | | | | | 10 |
| 1HI | | 10 | | | | | | | | | | | | | | |
| 2HA | | 12 | 9 | 9 | 0.2 | 11.4 | 12.6 | 12.6 | 9 | 9 | 9 | 9 | 11.4 | 11.4 | 9 | |
| 2HB | | | | | | | | | | | | | | | | 10 |
| 1PB | | | | | | | | | | | 18 | | | | | |
| 1PC | | 18 | 18 | 17 | 20.5 | 23 | 26 | 26 | | 18 | | 18 | 23 | 23 | | 18 |
| 1PD | | | | | | | | | | | 21.5 | | | | | |
| 2PA | | 10.5 | 10.5 | 9.5 | 12 | 13.5 | 15 | 15 | 10.5 | 10.5 | 10.3 | | | | 30 | 14 |
| 2PB | | | | | | | | | | | | 10.5 | | | | |
| 2PC | | | | | | | | | | | | | 13.5 | | | |
| 2PD | | | | | | | | | | | | | | 13.5 | | |
| Plasticizers: | | | | | | | | | | | | | | | | |
| Epoxy types | 4 | 3 | | | | | | | | | | | | | | |
| Stabilizers: | | | | | | | | | | | | | | | | |
| Mark 1004 | 5 | 2.75 | 2.75 | 2.75 | 2.75 | 2.75 | 2.75 | 2.75 | 2.75 | 2.75 | 2.75 | 2.75 | 2.75 | 2.75 | 2.75 | 2.75 |
| Mark C | 6 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Irganox 1076 | 7 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 |
| Lubricant: | | | | | | | | | | | | | | | | |
| Stearic acid | | | 0.5 | 0.5 | 0.5 | 0.5 | 0.5 | 0.5 | 0.5 | 0.5 | 0.5 | 0.5 | 0.5 | 0.5 | 0.5 | 0.5 |
| Fatty acid ester | 8 | 0.6 | | | | | | | | | | | | | | |
| Filaments: | | | | | | | | | | | | | | | | |
| Antimony oxide | 9 | | 5 | 5 | 5 | 5 | 5 | 5 | 5 | 5 | 5 | 5 | 5 | 5 | 5 | 5 |
| Titanium oxide | 10 | 3 | | | | | | | | | | | | | | |
| Aluminum paste | 11 | | 2.5 | 2.5 | 2.5 | 2.5 | 2.5 | 2.5 | 2.5 | 2.5 | 2.5 | 2.5 | 2.5 | 2.5 | 2.5 | 2.5 |
| Modifier: | | | | | | | | | | | | | | | | |
| Acryloid K-120-N | 12 | 1 | | | | | | | | | | | | | | |
| Acryloid KM-607 | 13 | 7 | | | | | | | | | | | | | | |
| Blowing agent: | | | | | | | | | | | | | | | | |
| Celogen RA | 14 | 2 | | | | | | | | | | | | | | |
| Physical properties: | | | | | | | | | | | | | | | | |
| Flame retardancy | 15 | | −2 to 1 | 6–10 | 0–2 | 0–3 | 0–4 | 6–12 | −20 | | | | | | | |
| Masland ° C | 16 | | −3 to +1 | −10 to −6 | −6 to −1 | −8 to −5 | −15 to −7 | to −14 | | | | | | | | |
| Elongation | 17 | | 220–250 | 220–250 | 230–260 | 240–270 | 240–280 | 250–290 | | | | | | | | |
| 100% modulus | 18 | | 3,000–3,330 | 3,900–3,300 | 2,500–3,000 | 3,000–2,500 | 1,700–1,900 | 1,700–1,900 | | | | | | | | |
| Ultimate tensile strength | 19 | | 4,100–4,700 | 4,100–4,700 | 3,600–3,900 | 3,100–3,500 | 2,800–3,200 | 2,800–3,200 | | | | | | | | |

EXAMPLE G — ADHESIVE PREPARATION

An emulsion adhesive is prepared by mixing together 50 parts by weight of an emulsion system containing homopolymer polyvinyl acetate available commercially under the trade designation GELVA Emulsion S-55 from the Monsanto Company with 50 parts by weight of Neoprene latex emulsion available commercially under the trade designation NEOPRENE LATEX 400 from the duPont Co. The resulting product emulsions contain approximately 50 weight percent total solids.

Each of the adhesives of Examples, D, E, F and G has a flame spread rate of less than about 50 measured using the small flame tunnel test described above.

EXAMPLES H THROUGH V — PREPARATION OF FACING LAYERS

Facing layers are here prepared from starting blends containing a plasticizer composition and a vinyl chloride polymer. Each such blend is first heat fused and calendered to produce a desired facing layer for use in making constructions of the invention.

To make each blend, polymer, plasticizer composition, and additives are mixed together. As those of ordinary skill in the art of vinyl chloride polymers fully appreciate, a film or sheet of vinyl chloride polymer needs small amounts of stabilizers and lubricants compounded thereinto during the course of manufacture. Usually (based on each 100 parts by weight of polymer in starting blend), there are employed typically from about 1 to 3 parts by weight of stabilizer and typically from about 0.5 to 1 parts by weight of lubricant.

Layers of the invention are prepared therefrom by first adding each blend to a so-called Banbury type mixer wherein the components are heat-fused to a uniform mass. Thereafter, a fused mass is continuously fed first to a mill roll and then to a set of four calender rolls to produce a desired layer. Processing temperature range from about 130° to 215° C. Each facing layer is about 3.5 to 4 mils in average thickness. Results are summarized in Table III below.

Each such layer has excellent fire-retardancy, low temperature flexibility, and tensile strength properties.

EXAMPLES 1 THROUGH 4
Laminate Constructions

To prepare laminate constructions each comprising facing layer and adhesive layer as illustrated in FIG. 2, the materials prepared as described above are employed.

In one method of preparation (designated Process 1 for reference purposes) a facing layer and a solid preformed adhesive layer are heat fused together using an equipment arrangement generally like that described above in reference to FIG. 3. The temperature of roll 26 is maintained at about 250° to 275° F.

In another method of preparation (designated Process 2 for reference purposes), a precut sample of a facing layer is coated with a liquid adhesive and allowed to air dry. The dry adhesive film thickness is about 2 mils.

In another method of preparation (designated Process 3 for reference purposes), precut samples each about 1 ft. sq. of, respectively, bat facing layer, and separately formed adhesive layer are cut from stock materials prepared as described above. The layers are brought together to form a laminated and heat fused between a pair of platens in a press heated in the range of from about 250° to 275° F.

In another method of preparation (designated Process 4 for reference purposes), precut samples each about 1 ft. sq. facing layer are each coated with a liquid adhesive so as to produce a coating or layer on such facing layers each about 2 mils thick (dry basis).

The starting materials, the resulting laminate constructions, and their respective methods of preparation are as shown in Table 4 below. All such laminates display excellent flame retardancy characteristics.

TABLE IV

| Ex. No. | Facing layer (ex. no.) | Adhesive layer (ex. no.) | Method of preparation (designation no.) |
|---|---|---|---|
| 1 | I | D | Process 1 |
| 2 | K | D | Process 3 |
| 3 | L | D | Process 4 |
| 4 | M | E | Process 2 |

EXAMPLES 5 THROUGH 14
Insulation Constructions

To prepare insulation constructions of the invention as illustrated in FIG. 1, each using a facing layer, an adhesive layer, and a bat, the materials prepared as described above are employed.

In one method of preparation (designated Process 5 for reference purposes), a preformed laminate of a facing layer and an adhesive layer (prepared as described in Examples 1 through 4 above) are each heat fused to a bat using an equipment arrangement similar to that described above in reference to FIG. 5 except that in place of rolls 69 and 72, a single payoff roll of preformed laminate is employed (not illustrated). The temperature of roll 73 is maintained at about 250° to 275° F.

In another method of preparation (designated Process 6 for reference purposes), a facing layer, an adhesive layer and a bat are heat fused together using an equipment arrangement generally like that described above in reference to FIG. 6. The temperature of roll 73 is maintained at about 250° to 275° F.

In another method of preparation (designated Process 7 for reference purposes), a precut sample 4 × 24 inches of facing layer having an adhesive layer laminated thereto and a bat are heat fused together by means of the adhesive layer using a hydraulically operated molding press using flat, spaced parallel plates. The temperature of lamination is about 250° to 275° F. using about 30 to 50 p.s.i. between plates for about 15 hours.

In another method of preparation (designated Process 8 for reference purposes), a facing layer, a liquid adhesive, and a bat are fastened together using an equipment arrangement generally like that described above in reference to FIG. 5. Here, an adhesive layer (about 2 mils dry average thickness) is formed in situ in the process of making an insulation construction. The temperature of drier 62 is maintained at about 180° to 250° F.

In another method of preparation (designated Process 9 or reference purposes), precut samples each about 4 × 24 inches of, respectively, facing layer, and bat, are cut from stock materials prepared as described above. A liquid adhesive is brushed onto one face of the bat to yield a layer thereon (dry) equivalent to about 2 mils in average thickness so-coated bat and the facing layer are physically brought together to form an adhesive construction and allowed to dry.

TABLE V

| Ex. No. | Facing layer (example number) | Bat (example number) | Adhesive Layer (example number) | Method of preparation (designation number) | Comments |
|---|---|---|---|---|---|
| 5 | I | A | D | Process 5 | Laminate of Ex. 1 used. |
| 6 | K | B | E | Process 8 | |
| 7 | L | C | F | do | |
| 8 | M | B | G | do | |
| 9 | L | D | D | Process 7 | Laminate of Ex. 3 used. |
| 10 | K | B | D | do | Laminate of Ex. 4 used. |
| 11 | I | B | D | Process 6 | |
| 12 | N | C | G | Process 9 | |
| 13 | I | B | G | do | |
| 14 | I | A | E | do | |

The adhesive constructions of Example 5 through 14 display excellent flame retardant characteristics.

EXAMPLES 15 THROUGH 18

To prepare two-layered, insulation constructions of the invention as illustrated in FIG. 2 except that the adhesive layer 18 is replaced with a bat (not shown), there are employed:

A. blends of vinyl chloride polymer and plasticizer composition suitable for use as starting materials for making facing layer as taught herein, and as used to make the layers of Examples H through V, and B. bats as described above in Examples A through C. These materials are used in a Zimmer coating machine adjusted first to produce continuously a facing layer by heat fusion and then (while the so-produced facing layer is still substantially at or near fusion temperatures of from about 130° to 215° C. laminate such layer continuously to a preformed bat to form an insulation construction of the invention. A description of a Zimmer coating machine appears in "Plastics" for June, 1966, pp. 742 and 743.

TABLE VI

| EX. No. | Facing layer (ex. no.) | Bat (ex. no.) |
|---|---|---|
| 15 | I | A |
| 16 | K | B |
| 17 | L | B |
| 18 | M | C |

The adhesive constructions of Examples 15 through 18 display excellent flame retardant characteristics.

What is claimed is:

1. A method for making a fire-retardant, faced, low density insulation construction from a preformed facing layer comprising vinyl chloride polymer and flame retardant plasticizer composition therefor, a preformed bat comprising a matrix of siliceous fibers bound together with a thermoset aminoplast modified phenolic resin adhesive, and a preformed solid adhesive layer comprising vinyl chloride polymer resin adhesive having a heat softening temperature below the heat softening temperature of said facing layer, said method comprising the steps of:
   A. heat fusing a said facing layer to a said adhesive layer, and
   B. heat fusing the laminate comprising such facing layer and such adhesive layer to a said bat.

2. The method of claim 1 wherein both of said heat-fusing steps are performed substantially concurrently.

3. A method for making a fire-retardant, faced, low density insulation construction from a fire-retardant faced layer and a fire-retardant bat comprising the steps of:
   A. heat fusing a blend of vinyl chloride polymer and a plasticizer composition to form a faced layer having an average thickness of from about 3 to 12 mils, there being from about 18 to 90 parts by weight of said plasticizer composition for each 100 parts by weight of said vinyl chloride polymer, said plasticizer composition comprising on a 100 parts by weight total composition basis:

1. from about 12 to 30 parts by weight of a first halogenated hydrocarbon having a halogen content ranging from about 40 through 72 weight percent, an average molecular weight of from about 300 through 750 per molecule, a percent weight loss per time unit at 250° C. of from about 1.5 to 14 percent per minute, and a percent weight loss at 350° C. of from about 0 to 30 percent per minute, and a weight loss rate at 250° C. of from about 30 to 260 mg./min., and a weight loss rate at 350° C. of from about 0 to 625 mg./min.;
   2. from about 12 to 30 parts by weight of a second halogenated hydrocarbon having a halogen content ranging from about 55 through 75 weight percent, an average molecular weight of from about 600 through 1,100 per molecule, a percent weight loss at 250° C. of from about 0.2 to 1 percent per minute, and a percent weight loss at 350° C. of from about 40 to 60 percent per minute, and a percent weight loss at 500° C. of from about 0.5 to 5 percent per minute, and a weight loss rate at 250° C. of from about 5 to 20 mg./min., a weight loss rate at 350° C. of from about 725 to 1,200 mg./min., and a weight rate at 500° C. of from about 40 to 80 mg./min.;
   3. the difference in said respective weight loss rates between said first halogenated hydrocarbon and said second halogenated hydrocarbon being at least about 100 mg./min. at 350° C. in any given plasticizer composition of the invention: and
   4. from about 40 to 75 parts by weight of a trisubstituted organo phosphate having the structure:

wherein $R_1$, and $R_2$, and $R_3$ are each selected from the group consisting of aliphatic hydrocarbon groups containing from one through 12 carbon atoms each, aromatic hydrocarbon groups containing from six through 12 carbon atoms each, halogenated aliphatic hydrocarbon groups containing from two through 18 carbon atoms each, and at least one halogen atom for every two carbon atoms, and halogenated aromatic hydrocarbon groups containing from three through 18 carbon atoms each and at least one halogen atom for every six carbon atoms, B. contacting the resulting facing layer while the same is at fusion temperatures with one face of a bat having a pair of spaced, generally parallel faces comprising a matrix of siliceous fibers ranging in average length from about 0.3 to 8 inches, and in average diameter from about 0.5 to 15 mils, bound together with from about 3 to 15 weight percent (based on total bat weight) of a thermoset aminoplast modified phenolic resin adhesive, said bat having an average density of from about 0.3 to 8 pounds per cubic foot, thereby to form the desired insulation construction.

* * * * *